United States Patent [19]

von Bonin et al.

[11] Patent Number: 5,639,800

[45] Date of Patent: Jun. 17, 1997

[54] PRODUCTION OF FLAME RESISTANT, HALOGEN-FREE POLYURETHANE/POLYUREAS

[75] Inventors: Wulf von Bonin; Hanns-Peter Müller; Gert Jabs, all of Odenthal, Germany

[73] Assignee: Bayer Aktiengesellschaft, Leverkusen, Germany

[21] Appl. No.: 623,037

[22] Filed: Mar. 28, 1996

[30] Foreign Application Priority Data

Apr. 4, 1995 [DE] Germany ............ 195 12 470.7

[51] Int. Cl.$^6$ .................................................. C08G 18/06
[52] U.S. Cl. .................... 521/103; 521/107; 521/118; 521/123; 521/109.1; 521/152; 521/158; 524/701; 524/706; 524/707; 524/724; 524/786; 524/779; 528/72
[58] Field of Search ........................... 521/103, 107, 521/118, 123, 109.1, 152, 158; 524/701, 706, 707, 724, 786, 779; 528/72

[56] References Cited

U.S. PATENT DOCUMENTS

| | | | |
|---|---|---|---|
| 3,414,374 | 12/1968 | Stossel | 556/174 |
| 3,945,987 | 3/1976 | Stossel | 564/63 |
| 4,076,540 | 2/1978 | Stossel | 428/532 |
| 4,680,324 | 7/1987 | Malwitz | 524/58 |
| 5,053,148 | 10/1991 | von Bonin | 252/3 |
| 5,118,814 | 6/1992 | Berneth et al. | 548/455 |
| 5,182,049 | 1/1993 | von Bonin | 252/378 |
| 5,328,719 | 7/1994 | von Bonin | 427/165 |
| 5,425,901 | 6/1995 | von Bonin et al. | 252/610 |

FOREIGN PATENT DOCUMENTS 3833977  4/1990  Germany.

*Primary Examiner*—Rachel Gorr
*Attorney, Agent, or Firm*—Sprung Horn Kramer & Woods

[57] ABSTRACT

In the production of a flame resistant, halogen-free polyurethane/polyurea from a polyisocyanate and polyol, wherein to the mixture of polyisocyanate and polyol there is added an amine adduct of an acidic metal salt of the formula $$A_{1-3}B_{0-12}P_{3-9}N_{4-12}M_{0-9}xH_2O \qquad (I),$$

in which

A denotes at least one hydroxide or oxide of a metal selected from the group consisting of aluminum, magnesium, calcium and zinc, B denotes o-boric acid, P denotes an acid containing phosphorus, N denotes at least one of an amine or ammonia, M denotes an alkali metal hydroxide and x denotes an integer from 0 to 90.

The products are especially flame resistant foams.

11 Claims, No Drawings

PRODUCTION OF FLAME RESISTANT, HALOGEN-FREE POLYURETHANE/POLYUREAS

This invention relates to the production of flame resistant, halogen-free polyurethane/polyureas with improved properties.

Additives to improve the fire behavior of polyurethane/polyureas which contain halogen compounds and/or soluble phosphorus compounds are indeed very effective, but potentially toxic, frequently susceptible to hydrolysis and relatively expensive. Endeavors are thus made to avoid them.

Halogen-free inorganic fillers, for example metal phosphates, are also highly effective fire proofing additives. However, due to their inability to participate in the chemical reactions proceeding during polyurethane/polyurea production, such fillers are distributed non-homogeneously, which may readily be discerned on microscopic examination, and results in degradation of mechanical properties (embrittlement).

According to prior proposals (see pending application Ser. No. 08/424,678 and German Patent application P 44 38 409.2), it is possible to obtain polyurethane/polyureas, during the production of which aqueous preparations of amine adducts of acidic metal salts were used. Those adducts participate in the chemical reactions proceeding during polyurethane/polyurea production, and the resultant products contain these adducts in a homogeneous distribution, for example incorporated into the cell walls. It is possible in this manner to produce both polyurethane/polyureas which are tough and resilient and those with rigid foam properties.

The water introduced with the adduct preparation does not have a negative effect on foam formation. Light, stable foam articles with a uniformly fine-pored structure are even produced when less polyisocyanate is used than would be necessary to combine the water by reaction with polyisocyanate.

The polyurethane/polyureas produced with aqueous preparations of amine adducts of acidic metal salts generally pass all the tests which are necessary for classification in fire class B2 (see DIN 4102). However, the so-called combustion shaft test is not passed. In this test, a chimney-like shaft is made from the material to be tested and is exposed to a gas flame from below. After a certain period of exposure to the flame, the material to be tested must not continue to burn and may be damaged only up to a certain height.

A process has now been found for the production of flame resistant, halogen-free polyurethane/polyureas from polyisocyanates and polyols, which process is characterized in that, during production, there are used aqueous solutions of sugars and/or polymethylol compounds along with amine adducts of acidic metal salts of the formula $$A_{1-3}B_{0-12}P_{3-9}N_{4-12}M_{0-9}xH_2O \qquad (I),$$

in which

A denotes one or more metal compounds from the group comprising hydroxides and oxides of aluminum, magnesium, calcium and zinc, B denotes o-boric acid, P denotes an acid containing phosphorus, N denotes amine and/or ammonia, M denotes alkali metal hydroxide and x denotes an integer from 0 to 90.

Polyurethane/polyureas which are produced according to the invention are preferably cellular.

A particular embodiment of the process according to the invention is characterized in that urea is additionally used.

The addition of urea surprisingly gives rise to a reduction in the viscosity of the aqueous preparation of amine adducts on acidic metal salts. This improves processability and yields excellent results in the combustion shaft test.

It is possible according to the invention to produce polyurethane/polyurea foams with, for example, densities in the range from 15 to 500 g/l, with the addition of more than 5 wt. % of amine adducts of acidic metal salts and with the addition of more than 0.5 wt. % of sugars and/or polymethylol compounds and optionally urea.

Preferred amine adducts of acidic metal salts of the formula (I) are those of the formula (II)

$$A_{2-3}B_{3-9}P_6N_{6-9}M_{0-5}xH_2O \qquad (II)$$

wherein the symbols have the meanings stated in defining formula (I).

In the formulae (I) and (II), P preferably denotes o-phosphoric acid, methyl-phosphonic acid, pyrophosphoric acid, oligophosphoric acid and/or polyphosphoric acid. In the formulae (I) and (II), A preferably denotes aluminum hydroxide, P preferably denotes o-phosphoric acid, N preferably denotes an alkanolamine, e.g. a lower alkanolamine, in particular mono-, di- and/or triethanolamine, M preferably denotes sodium or potassium hydroxide and x preferably denotes an integer from 6 to 36. N particularly preferably denotes monoethanolamine.

Suitable amine adducts of acidic metal salts, the aqueous preparations thereof and the production thereof are described, for example, in U.S. Pat. No. 5,118,814, 5,053,148, 5,182,049 and 5,425,901 as well as pending application Ser. No. 08/149,424 and 08/424,678 and German OS 42 26 044 and 44 38 409.2.

Suitable amine adducts of acidic metal salts may most simply be obtained by combining, for example, an acidic aluminum phosphate in an aqueous medium with stirring at 20° to 120° C. with an alkanolamine or an adduct of alkanolamine on o-boric acid while maintaining final pH values of, for example, 5 to 8.5, preferably of 6 to 7.0.

Aqueous preparations of amine adducts of acidic metal salts preferably contain less than 50 wt. %, particularly preferably 20 to 45 wt. %, of water.

Aqueous solutions of sugars which may, for example, be considered are those of conventional sugars and sugar-like compounds. The sugars may, for example, be trioses, tetroses, pentoses and carbohydrates, such as soluble starch, dextrins, dextrans, saccharose, glucose, fructose, lactose, maltose and invert sugar. Sugar-like compounds which may be cited are, for example, not only the sugar syrups, for example glucose syrup, obtainable by acid hydrolysis or enzymatic degradation of cellulose or starch, but also polyalcohols such as low molecular weight polyvinyl alcohols, sorbitol, mannitol, pentaerythritol and sugar-like commercial formaldehyde condensation products, so-called formoses. Sugars and sugar-like compounds may be used individually or in any desired mixtures with each other.

Aqueous solutions of polymethylol compounds which may, for example, be considered are those of methylol compounds of phenols, urea and/or melamine and/or N-methylol compounds of water-soluble resols and/or novolaks. N-methylol compounds are preferred. Individual polymethylol compounds and also any desired mixtures of different polymethylol compounds may be used. Further examples of polymethylol compounds are water-soluble aminoplastic resins and water-soluble casein/formaldehyde resins, ureamethylol compounds with up to four methylol groups per molecule and the water-soluble precondensation products thereof. Ureamethylol compounds may also be derived from biuret and higher condensation products of urea. Water-soluble melamine/methylol compounds and water-soluble methylol compounds of commercial melamine resins, for example, containing three to six methylol groups per molecule, and the precursors thereof are preferred. It is also possible to use melamine resin dispersions. It is in particular the preferred methylol compounds which promote the fire resistant properties of the polyurethane/polyureas produced therefrom.

The aqueous solutions of sugars and polymethylol compounds also preferably contain less than 50 wt. %, particularly preferably between 20 and 45 wt. %, of water. Sugar solutions may, for example, be used as a mixture with the aqueous preparation of amine adducts of acidic metal salts, for example in the form of a premix. It is optionally also possible to adjust such premixes to a pH value of 5.5 to 8 by adding a base already present in the system (for example ethanolamine, triethanolamine, ammonia or alkali metal hydroxide).

According to a particular embodiment, production according to the invention of polyurethane/polyureas is performed in such a manner that the aqueous solution of sugars and/or polymethylol compounds is produced in situ, for example by dissolving solid sugars and/or polymethylol compounds in aqueous solutions of amine adducts of acidic metal salts, for example at 10 to 100, preferably 20° to 60° C.

If polymethylol compounds are (also) used, it is advantageous either to introduce these separately into the reaction zone or to mix them into one or more starting components just before the reaction.

If urea is used, it is convenient to dissolve it in the aqueous preparation of the amine adducts of the acidic metal salts, optionally at elevated temperature, preferably at 30° to 95° C.

It is possible, for example, to use 0.5 to 250 wt. %, preferably 1 to 100 wt. % of sugars and/or polymethylol compounds and optionally 0 to 70 wt. %, preferably 0.1 to 50 wt. % of urea, the quantities being in each case relative to the amine adducts of acidic metal salts.

Polyisocyanates which may be considered are aliphatic, aromatic, araliphatic, modified and unmodified polyisocyanates, as are conventionally used for the production of polyurethane/polyureas. Preferred polyisocyanates are commercially available, liquid grades of MDI, for example based on aniline/formaldehyde condensation products, tolylene diisocyanates and the, preferably high-boiling, modification products thereof.

Polyols which may be considered are, in particular, aliphatic alkoxylation products, preferably containing tertiary nitrogen atoms, of ammonia and amines, as are conventionally used in the production of polyurethane/polyureas. Preferred alkoxylation products are ethoxylation and propoxylation products, while preferred amines are those with 1 to 12, in particular 1 to 8 amino groups per molecule. The alkoxylation products may have OH values of, for example, above 50, preferably of above 300. Specific compounds which may be mentioned are: mono-, di- and triethanolamine, tripropanolamine, ethoxylation and propoxylation products of ammonia or triethanolamine, ethylenediamine, polyethylene polyamine and the mixtures thereof. Triethanolamine and the propoxylation products thereof with OH values of 300 to 600 are particularly preferred. The polyols taken into consideration are generally basic.

In addition to polyisocyanates, polyols and the components to be used according to the invention for the production of polyurethane/polyureas, it is possible optionally to add further components which are known per se in polyurethane chemistry. Such further components may, for example, be modified or non-basic polyols, stabilizers, cell regulators, emulsifiers, activators, carboxylic acids, pH regulators and/or additives.

Examples of modified polyols which may be considered are: polymer polyol dispersions, dispersions of PHD, of polyurea and of aminoplastic/polyol, polyether polyols with characteristics other than those stated above for polyols, for example with other starter molecules, other OH values and/or further reactive groups, such as amino, carboxyl and/or sulphoxyl groups. Sugar polyols, ester polyols, polyester polyols, polyetheramines and/or polyesteramines, in each case with molecular weights of, for example, 62 to 12000 and OH values of, for example, 10 to 800, preferably of 30 to 600, may also be used.

Stabilizers which may be considered are, for example, those based on polyether/polysiloxane; surfactants may also be considered as emulsifiers and tertiary amines and organometallic compounds may, for example, be considered as activators, as in conventional polyurethane chemistry.

The carboxylic acids may be mono- or polycarboxylic acids and may, for example, be those which have 1 to 180 C atoms, preferably 1 to 60 C atoms and are liquid at room temperature. Examples of carboxylic acids are: formic acid, acetic acid, alkylacetic acids and phenylacetic acids with preferred acids being liquid, natural fatty acids such as oleic acid, ricinoleic acid, linseed oil fatty acid, isostearic acid, tall oil fatty acid, soy oil fatty acid, fish oil fatty acid and rapeseed oil fatty acid, synthetic fatty acids and the dimeric and trimeric acids and fatty acid polymers obtainable from the stated fatty acids. Oleic acid and fatty acid mixtures containing oleic acid are particularly preferred. The fatty acids may also entirely or partially be used in their salt form: for example as sodium, potassium and/or alkanolamine salts. In a less preferred embodiment, halogenated fatty acids may be used, for example, chlorinated, brominated and/or iodinated oleic acid, ricinoleic acid and/or linseed oil fatty acid. It is not absolutely essential to add carboxylic acids, but it is preferred because it frequently considerably accelerates formation of the foam and yields a particularly fine-pored foam. The proportion of carboxylic acids in the complete reaction mixture may, for example, be 0 to 25 wt. %. This proportion is preferably 1 to 10 wt. %.

If desired, pH may be regulated with acids, mines or alkalies. o-Phosphoric acid, ethanolamine and sodium hydroxide are preferred. The pH value of the reaction mixture is preferably adjusted to 5.5 to 8, particularly preferably to 6.5 to 7.5.

Additives may be of the most varied nature. They may, for example, be blowing agents, fillers and/or sugars and/or polymethylol compounds in a form other than as an aqueous solution. Blowing agents which may be considered are, for example, pentane, cyclopentane, fluorocarbons, halogenated fluorocarbons, dimethyl ethers and others, as are conventional in polyurethane chemistry. The proportion of blowing agents in the complete reaction mixture may, for example, be 0 to 20 wt. %. This proportion is preferably between 3 and 10 wt. %.

Fillers which may be considered are, for example, hydrophobizing natural oils such as rapeseed oil, paraffin oils and/or paraffin waxes, as well as polyisobutylenes, polysiloxanes, polyolefins and/or fluorinated polymers.

Fillers may also impart an additional flame resistant effect, wherein they may then be, for example, solid, expanded, expandable, liquid, pulverulent materials or in the form of beads or hollow beads. Examples are: expandable graphites, expandable micas, silicates, glasses, borosilicates, intumescent and non-intumescent additives which impart flame retardancy, such as urea resin, melamine resin or phenolic resin powders, phosphate esters, polyols containing phosphorus, amine, alkali metal, alkaline earth metal, zinc and/or aluminum salts of acids of phosphorus or boron dissolved in water or in powder form (for example ammonium phosphate, ammonium polyphosphate, borax, zinc borate, ethanolamine borate, together with primary and/or secondary orthophosphates of ammonia, monoethanolamine, sodium, aluminum and/or zinc and/or phosphates as described in U.S. Pat. Nos. 3,414,374, 3,945,987 and 4,076,540), ethylenediamine phosphate, mono-, di- and/or triethanolamine o-phosphates, melamine, melamine phosphates, dicyandiamide, biuret, amides and/or esters of phosphoric acids, such as tricresyl phosphate, phenylalkyl phosphates, tris-trichloroethyl phosphate, ammonium chloride, ammonium bromide, halides of amines and metals, such as sodium bromide or polyalkylene polyamine hydrobromides, triethanolamine hydrobromide, ortho-, meta-, pyro- or polyphosphoric acids optionally in an aqueous solution or in salt form, hydrogen chloride, hydrogen bromide, colemanite, zinc borate, titanium dioxide and/or magnesium and/or aluminum hydroxides. Halogen-free additive components are preferred.

Sugars and/or polymethylol compounds, such as pentaerythritol, sugar, starch, paraformaldehyde, ureamethylol compounds, phenolic resins and/or amine adducts of metal phosphates, which are to be added as an aqueous solution according to the invention may additionally be added in solid form to the reaction mixture as fillers.

In general, all the components to be introduced into the reaction mixture are introduced individually or suitably pre-mixed into the reaction zone and, disregarding the sugar solution, the polymethylol compounds, the amine adducts onto acidic metal salts and the water introduced with these components, more than the equivalent quantity of polyisocyanates is used. This quantity of polyisocyanate may, for example, be above 120 equivalent-%, preferably 150 to 250 equivalent-%.

Amine adducts of acidic metal salts, sugar and/or polymethylol compounds may together be introduced into the reaction mixture (excluding blowing agents and fillers), in quantities of, for example, more than 5 wt. %, preferably of more than 25 wt. %, in particular of 30 to 80 wt. %.

When stating the relative quantities of components in the reaction mixtures for the production of polyurethane/polyureas according to the invention, it is frequently more convenient to use not stoichiometric, but weight ratios. It is, for example, possible to proceed with the following relative quantities:

a) Amine adducts of acidic metal salts: for example above 1 wt. %, preferably 3 to 75 wt. %, in particular 5 to 65 wt. %.
b) Urea: for example 0 to 40 wt. %, preferably 1 to 30 wt. %.
c) Total sugars and polymethylol compounds: for example 0.5 to 65 wt. %, preferably 1 to 50 wt. %, in particular 10 to 40 wt. %, wherein the sum of a) +b) +c) may be, for example 25 to 75 wt. %, preferably 40 to 65 wt. % and wherein, of the components sugars and polymethylol compounds, only one need be present, and when both are present, any desired relative quantities are possible.
d) Total polyisocyanate, polyol, modified polyols, activators and emulsifiers: for example 10 to 75 wt. %, preferably 25 to 55 wt. %, wherein the quantity of isocyanate, stated in equivalent-%, is as stated above.
e) Carboxylic acids: for example 0 to 20 wt. %, preferably 1 to 10 wt. %.
f) Additives (without blowing agents): for example below 60 wt. %, preferably 0 to 50 wt. %.
g) Blowing agents: for example 0 to 20 wt. %, preferably 3 to 10 wt. %.
h) Water: for example 1 to 15 wt. %, preferably 3 to 9 wt. %.

Components a) to h) together always add up to 100 wt. %.

It is generally advantageous to perform the production process according to the invention with heating. Temperatures may, for example, be 10° to 70° C., preferably 15° to 40° C., with the individual components being heated before being brought together and/or while they are being brought together and/or after they have been brought together. If ovens are used for heating, these may be operated at, for example, 30° to 100° C., preferably 65° to 95° C.

The process according to the invention may be performed with or without the use of blowing agents and at standard pressure or at a pressure above standard pressure. Depending upon these parameters, solid products or foams which are foamed to a greater or lesser extent are obtained. Preferably, foams are produced which have densities of between 15 and 500 g/l, in particular between 18 and 50 g/l and pores of between 0.01 and 3 mm in diameter.

Foam production itself may proceed using processes which are conventional in polyurethane foam technology. For example, it is possible to use batch or continuous processes, high, medium and low pressure multi-component mixing processes using nozzle or stirred mixing heads, casting, spraying, injection molding, rotational molding or twin belt production processes and free or in-mold foaming processes in open or closed, heated or unheated molds and under pressure or without pressure.

Foams produced according to the invention may be used, for example, in packaging, acoustic insulation, decorations, cladding, filters (in particular air filters), insulation products and fireproofing. They have improved fire resistance and low fire loads.

Since foams according to the invention may be produced with open pores, they may optionally additionally be metallized, impregnated or coated, for example with flame retardant substances, casting resins, lacquers, hydrophobizing agents, biocides, silicone oils, additional quantities of the amine adducts of acidic metal salts used during their production, mortars and/or renders.

Foams produced according to the invention may also be used for the production of sandwich products with various outer layers, for example with outer layers made from paper, textile glass gauzes, metallic gauzes, organic gauzes, woven fabrics, laid fabrics, nonwoven fabrics, films, veneers or sheets of plastic, wood or metal. Such foams may also be used to fill cavities, as fixing aids in the construction sector, as acoustic insulation, as a filter or packaging material and to provide impact protection.

Since these foams may be produced with a largely open-pore structure, they are well suited to the production of so-called vacuum panels, in which the foam is provided with an air tight coating or covering and is evacuated. Improved insulation action may be achieved in this manner.

The foams may be machined, worked by thermal methods, welded, embossed or multi-dimensionally shaped and cut. Depending upon the degree of drying, they have residual moisture contents of, for example, 0.5 to 15 wt. % and, over the range from 120° to 200° C., they also have a certain degree of thermoplastic properties, so making them thermoformable. The foams may also be electroplated and are thermally compressible and sawable. They thus have many uses as semi-finished products.

The polyurethane/polyureas, in particular polyurethane/polyurea foams, produced according to the invention are distinguished by improved performance against fire.

This is extraordinarily surprising because it could have been expected that the additional use of organic material according to the invention would give rise to an additional combustion gas load. The addition according to the invention of aqueous solutions of sugars and/or polymethylol compounds moreover surprisingly does not have any effect on the foamability of the foams, although aqueous solutions are often incompatible with polyisocyanates and the water and sugar and/or polymethylol compounds introduce additional OH groups, which are in principle capable of reacting with polyisocyanates and would thus have led one to expect unfavorably changed properties.

EXAMPLES

Unless otherwise stated, the parts and percentages given in the examples relate to weight.
Description of the production of the starting materials and the laboratory combustion shaft test method
(1) Metal phosphate/amine adduct solution (solution AB/1):
  a) 2768 parts of 85% o-phosphoric acid were diluted with 660 parts of water. 624 parts of aluminum hydroxide were then added and stirred for 30 minutes at 90° C. A clear solution of an acidic aluminum phosphate was produced.
  b) 741.6 parts of o-boric acid were then dissolved in 1600 parts of monoethanolamine and stirred at 70° C. with the addition of 24 parts of water, wherein a clear solution was produced.
  c) The two clear solutions obtained in this manner were thoroughly stirred together at 80° C., whereby a clear solution of the ethanolamine salt of boron/aluminum phosphate was produced.

This solution had a concentration of approximately 76% and, at 20° C., a density of 1.6 g/cm$^3$ and a viscosity of 3000 mPa -s.

This solution is described below as solution AB/1.
(2) Metal phosphate/amine adduct solution (solution AB/2):
  a) 183.2 parts of ethanolamine were converted into a clear solution in a stirred vessel with 185.4 parts of o-boric acid at 80° C.
  b) 173.3 parts of 85% o-phosphoric acid were introduced at room temperature into a stirred vessel. 212.5 parts of a 25% aqueous ammonia solution were then stirred in, the internal temperature being maintained below 50° C.
  c) 519.8 parts of 85% o-phosphoric acid were reacted with 156 parts of aluminum hydroxide at 95° C. to yield a virtually clear, acidic metal phosphate solution. The solution was then cooled to 70° C.
  d) The solution from b), at a temperature of 50° C., was thoroughly stirred into the solution from c), which had been maintained at 70° C. This produced a virtually clear, readily stirrable solution, which was stirred for 30 minutes at 90° C. The temperature was then reduced to below 50° C., so producing a pourable solution which was stable at room temperature.
  e) The solution obtained according to d) was mixed with vigorous stirring at 80° to 90° C. with the solution obtained according to a). Stirring was then continued for a further 1 hour at 80° to 90° C. and the mixture was then cooled while being stirred. A solution which was largely clear and readily pourable at room temperature was obtained (viscosity: 6000 mPa -s). This metal phosphate/amine complex solution is described below as solution AB/2.

(3) Metal phosphate complex solution (solution AB/3):
The solution obtained according to (2a) was stirred at room temperature into solution AB/1 obtained according to (1c). Stirring was continued for 30 minutes at 80° C. and a clear solution of the metal phosphate complex containing more boron was obtained. This solution is described below as solution AB/3.

(4) Sugar solution Z/1:
A 75% aqueous solution of conventional table sugar (=saccharose) was prepared.

(5) Sugar solution Z/2:
A conventional commercial 80% solution of so-called industrial glucose syrup, which is a mixture of the most varied sugars obtained enzymatically from starch.

(6) Solution of a polymethylel compound M/1:
An aqueous, approximately 75% solution of a largely uncrosslinked conventional commercial urea/formaldehyde resin (Plastopal®, BASF).

(7) Solution, of a polymethylol compound M/2:
A 75% aqueous solution of a conventional commercial uncrosslinked melamine/formaldehyde resin (Madurit®HW 550, Casella).

(8) Solution of a polymethylol compound M/3:
A 75% aqueous solution of a conventional commercial novolak resin (Rüttgers).

(9) Laboratory combustion shaft test method:
Test strips:
These were cut from the center of the foam article to be tested and had a roughened surface of the largest possible area. Dimensions were 2×20×5 cm. The strips were dried for 24 hours at 80° C. or were conditioned for 10 days at room temperature and 65% relative humidity. 4 test strips were used for each measurement as the walls of the shaft structure (square, open cross-section 3×3 cm).

Shaft structure:
The shaft initially consisted of a stainless steel wire mesh of an edge length of 5 cm and a height of 22 cm. The test strips were placed against the walls of this shaft, so giving an internal, open shaft of dimensions 3×3 cm with a height of 20 cm. The wire mesh of the outer holder extended 2 cm above the foam filling. The shaft prepared in this manner was placed onto a wire gauze, from which a central hole 4.5 cm in diameter had been cut. The shaft was centerd over the hole. A conventional commercial natural gas burner with a circular, perforated ceramic disk nozzle of 2.5 cm in diameter was centerd under the hole at a distance of 5 cm from the gauze and lit. The burner was operated with the gas on full and the air supply adjusted so that the flame was just no longer luminous and produced an approximately 6.5 cm non-luminous cone of flame. The burner was lit for 30 seconds. In the case of flammable foams, a flame of easily visible burning pyrolysis gases was produced above the shaft while the burner was in operation.

Tests:
The following parameters were then determined:
T1: Whether such a flame of burning pyrolysis gases was produced.
T2: Whether and, if so, when the pyrolysis gas flame went out once the burner had been lit.
T3: How long the foam shaft continued to burn, within a period of 30 seconds, after the burner had been turned off and T4: whether the foam was partially or entirely consumed by fire.

Five individual tests were performed for each test run and the results averaged.

These tests provide very reliable, reproducible relative data concerning the fire properties of the foams investigated if they are always performed in the same manner, as they were in the following examples. A comparison foam (obtained according to Example 1) was also used in each series of tests.

Example 1 (Comparative Example)

Foam without added sugars or polymethylol compounds 300 parts of solution AB/1, 3 parts by weight of 50% aqueous sodium hydroxide solution, 25 parts of propoxylated triethanolamine (OH value 500), 12.5 parts of oleic acid, 20 parts of triethanolamine, 2 parts of polyether/polysiloxane stabiliser and 30 parts of cyclopentane were vigorously premixed and immediately thereafter vigorously mixed with 100 parts of conventional commercial, technical MDI=diphenylmethane 4,4'-diisocyanate (Desmodur®44 V 20; Bayer AG).

As soon as foaming started, the mixture was placed in a box mold until it had blown to yield the finished foam. The foam was dried (test A) or conditioned (test B). The resultant, uniformly fine-pored foam had a density of 21 g/l. The combustion shaft test was performed, producing the following results:

|    | Test A                | Test B                        |
|----|-----------------------|-------------------------------|
| T1 | yes, strong           | yes                           |
| T2 | no                    | no                            |
| T3 | longer than 30 seconds| a little longer than 30 seconds |
| T4 | completely consumed   | partially consumed            |

Example 2 (Comparative Example)

The same method was used as in Example 1, but using solution AB/2 instead of AB/1. The resultant foam had a density of 25 g/l.

Test results

|    | Test A              | Test B                  |
|----|---------------------|-------------------------|
| T1 | yes                 | yes weaker than in Example 1 |
| T2 | no                  | no                      |
| T3 | 30 seconds          | 25 seconds              |
| T4 | partially consumed  | not consumed            |

It may be concluded from this that fire behavior is unsatisfactory when assessed against this critical standard.

Example 3 (Comparative Example)

The same method was used as in Example 1, but using solution AB/3 instead of AB/1. A fine-pored foam with a dry density of 31 g/l was obtained.

Test results:

|    | Test A              | Test B                |
|----|---------------------|-----------------------|
| T1 | yes                 | yes                   |
| T2 | no                  | no                    |
| T3 | 20 seconds          | 15 seconds            |
| T4 | partially consumed  | very slightly consumed|

Example 4

The same method was used as in Example 1, but using a mixture consisting of 80% of solution AB/1 and 20% of solution Z/1 instead of solution AB/1. A fine-pored foam with a density of 22 g/l was obtained.

Test results:

|    | Test A     | Test B     |
|----|------------|------------|
| T1 | yes        | yes        |
| T2 | no         | 19 seconds |
| T3 | 9 seconds  | 0 seconds  |

Example 5

The same method was used as in Example 1, but using a mixture consisting of 70% of solution AB/2 and 30% of solution Z/2 instead of solution AB/1. A fine-pored foam with a density of 23 g/l was obtained.

Test results:

|    | Test A     | Test B     |
|----|------------|------------|
| T1 | yes        | yes        |
| T2 | 24 seconds | 11 seconds |

Example 6

The same method was used as in Example 1, but using a mixture consisting of 70% of solution AB/3 and 30% of solution Z/2 instead of solution AB/1. A fine-pored foam with a density of 28 g/l was obtained.

Test results:

|    | Test A     | Test B     |
|----|------------|------------|
| T1 | yes        | yes        |
| T2 | 20 seconds | 11 seconds |

Example 7

The same method was used as in Example 1, but using a mixture consisting of 60% of solution AB/2 and 40% of solution M/3 instead of solution AB/1. A foam with a density of 29 g/l was obtained.

Test results:

|    | Test A     | Test B    |
|----|------------|-----------|
| T1 | yes        | yes       |
| T2 | no         | no        |
| T3 | 20 seconds | 5 seconds |

Example 8

The same method was used as in Example 1, but using a mixture consisting of 60% of solution AB/3 and 40% of solution M/1 instead of solution AB/1. A fine-pored foam with a density of 27 g/l was obtained.

Test results:

|    | Test A     | Test B     |
|----|------------|------------|
| T1 | yes        | yes        |
| T2 | no         | 29 seconds |
| T3 | 13 seconds | 0 seconds  |

Example 9

The same method was used as in Example 1, but using a mixture consisting of 50% of solution AB/1 and 50% of solution M/2 instead of solution AB/1. A uniformly fine-pored foam with a density of 27 g/l was obtained.

Test results:

|    | Test A         | Test B    |
|----|----------------|-----------|
| T1 | yes, very weak | no        |
| T2 | 5 seconds      | 0 seconds |

Example 10

The same method was used as in Example 1, but using a mixture consisting of 50% of solution AB/1, 10% of urea and 40% of solution M/2 instead of solution AB/1. A fine-pored foam with a density of 24 g/l was obtained.

Test results:

|    | Test A | Test B |
|----|--------|--------|
| T1 | no     | no     |

On conclusion of the test, the shaft wall was merely discolored and the lower parts which were in contact with the burner flame were slightly carbonized.

Example 11

The same method was used as in Example 9, but using 3 parts of 85% o-phosphoric acid instead of the sodium hydroxide solution. A fine-pored foam with a density of 34 g/l was obtained.

Test results:

|    | Test A         | Test B |
|----|----------------|--------|
| T1 | very weak to no | no    |

Example 12

The same method was used as in Example 1, but using a mixture consisting of 50% of solution AB/1, 30% of solution M/2 and 20% of solution Z/2 instead of solution AB/1. A fine-pored foam with a density of 26 g/l was obtained.

Test results:

|    | Test A    | Test B    |
|----|-----------|-----------|
| T1 | very weak | very weak |
| T2 | 6 seconds | 3 seconds |

Example 13

The same method was used as in Example 10, but 50 parts of neutralized, dry expanding graphite (expandable graphite, commercial product) were mixed in together with the polyisocyanate. An apparently homogeneous foam with a density of 38 g/l was obtained.

Test results:

|    | Test A            | Test B    |
|----|-------------------|-----------|
| T1 | very weak to no   | no        |
| T2 | 2 seconds         | 0 seconds |

In comparison with Examples 1 to 3, Examples 4 to 13 show the distinct improvement in fire behavior of the foams produced according to the invention.

Example 14

185 parts of o-boric acid and 429 parts of cane sugar were dissolved at 80° C. in 1530 parts of solution AB/1. The solution was then cooled and the same method was then used as was used with solution AB/1 in Example 1, but adding 3 parts of monoethanolamine instead of the sodium hydroxide solution. A fine-pored foam with a density of 30 g/l was obtained, which was mechanically tougher than the foam from Example 4.

Test results:

|    | Test A     | Test B     |
|----|------------|------------|
| T1 | yes        | yes        |
| T2 | 25 seconds | 15 seconds |
| T3 | 0 seconds  | 0 seconds  |

Example 15

If dry sheets of the foams produced according to Examples 4 to 13 are heat sealed in polyamide/polyvinylidene chloride composite films and evacuated, vacuum insulation units with advantageous fire resistance properties are obtained.

Example 16

Foams produced according to Examples 8 to 13 were used to seal wall conduits and wire ducts against the passage of fire. They proved particularly effective when they had additionally been impregnated with diluted solution AB/1 or melamine resins.

Example 17

Cut sheets of the films produced according to Examples 8 to 13 with a) an uncovered and b) an acoustically transmissively covered surface gave rise to fire resistant acoustic insulation units.

Example 18

Sheets made from the foams obtained according to Examples 8 to 13 were separately processed with metal foil, woven fabric, nonwoven fabric, paper, paperboard, compressed chip board, veneers, synthetic resins, bitumen and plaster to produce sandwich units. Insulating, light weight structural units with particularly favorable fire behavior were obtained.

Example 19

Foams produced according to Examples 4 to 7 were metallized, initially electrolessly and then galvanically, using conventional processes, and semi-finished products were obtained which were thermally compressible at 100° to 200° C. and deformable, embossable, cuttable and sawable at room temperature.

It will be appreciated that the instant specification and claims are set forth by way of illustration and not limitation, and that various modifications and changes may be made without departing from the spirit and scope of the present invention.

We claim:

1. In the production of flame resistant, halogen-free polyurethane/polyurea from a polyisocyanate and polyol, wherein to the mixture of polyisocyanate and polyol there is added an amine adduct of an acidic metal salt of the formula $$A_{1-3}B_{0-12}P_{3-9}N_{4-12}M_{0-9}xH_2O \qquad (I),$$

in which

A denotes at least one hydroxide or oxide of a metal selected from the group consisting of aluminum, magnesium, calcium and zinc, B denotes o-boric acid, P denotes an acid containing phosphorus, N denotes at least one of an amine or ammonia, M denotes an alkali metal hydroxide and x denotes an integer from 0 to 90, the improvement which comprises also adding to the mixture an aqueous solution of at least one sugar or polymethylol compound.

2. A process according to claim 1, wherein to the mixture urea is also added.

3. A process according to claim 1, wherein the adduct is of the formula $$A_{2-3}B_{3-9}P_6N_{6-9}M_{0-5}xH_2O \qquad (II),$$

in which

A denotes aluminum hydroxide,

B denotes o-boric acid,

P denotes o-phosphoric acid,

N denotes an alkanolamine,

M denotes sodium or potassium hydroxide and x denotes an integer from 6 to 36.

4. A process according to claim 1, wherein the sugar is selected from the group consisting of trioses, tetroses, pentoses, carbohydrates, dextrins, dextrans, saccharose, glucose, fructose, lactose, maltose, invert sugar, sugar syrups obtainable by acid hydrolysis or enzymatic degradation of cellulose or starch, polyalcohols and mixtures thereof, and the polymethylol compound is of materials selected from the group consisting of phenols, urea and/or melamine and/or N-methylol compounds of water-soluble resols, novolaks, water-soluble aminoplastic resins, water-soluble casein/formaldehyde resins, ureamethylol compounds with up to four methylol groups per molecule, the water-soluble precondensation products thereof and ureamethylol compounds derived from biuret and higher condensation product of urea.

5. A process according to claim 1, wherein the amine adduct of an acidic metal salt of the formula (I) is added as an aqueous preparation containing less than 50 wt. % of water and the aqueous solution of a sugar or polymethyol compound has a water content of less than 50 wt. %.

6. A process according to claim 2, wherein relative to the amine adduct of an acidic metal salt there are added 0.5 to 250 wt. % of a sugar or polymethylol compound and 0 to 70 wt. % of urea.

7. A process according to claim 1, wherein the mixture comprises amine adduct of an acidic metal salt of the formula (I): above 1 wt. %, urea 0 to 40 wt. %, sugar or polymethylol compound 0.5 to 65 wt. %, total polyisocyanate, polyol, modified polyols, activators and emulsifiers amount to up to 75 wt. %, wherein the quantity of polyisocyanate, disregarding the sugar solution, polymethylol compound, the amine adducts of an acidic metal salt and the water introduced with these components, is more than the equivalent quantity, carboxylic acids 0 to 20 wt. %, additives below 60 wt. %, blowing agents 0 to 20 wt. %, and water 1 to 15 wt. %, the sum of these components constituting 100 wt. %.

8. A process according to claim 1, wherein the polyurethane/polyurea is in the form of a foam with a density between about 15 and 500 g/l.

9. A foam produced by the process of claim 1.

10. A material for packaging, acoustic insulation, decorations, cladding, filters, insulation products or fireproofing, formed of a foam according to claim 9.

11. A sandwich product for use in filling cavities, as a fixing aid in the construction sector, as acoustic insulation, as a filter, packaging material or impact, comprising outer layers made from paper, textile glass gauzes, metallic gauzes, organic gauzes, woven fabrics, laid fabrics, nonwoven fabrics, films, veneers or sheets of plastic, wood or metal, and as filler between the outer layers a foam produced by the process of claim 1.

* * * * *